(12) United States Patent
Nazaran

(10) Patent No.: US 8,288,587 B2
(45) Date of Patent: Oct. 16, 2012

(54) CHELATE COMPOUNDS

(76) Inventor: Mohammad Hassan Nazaran, Tehran (IR)

(*) Notice: Subject to any disclaimer, the term of this patent is extended or adjusted under 35 U.S.C. 154(b) by 90 days.

(21) Appl. No.: 12/910,799

(22) Filed: Oct. 23, 2010

(65) Prior Publication Data
US 2012/0100372 A1    Apr. 26, 2012

(51) Int. Cl.
*C07B 57/00* (2006.01)
(52) U.S. Cl. .......... 562/553; 428/402; 977/773
(58) Field of Classification Search .......... 977/773; 562/553; 428/402
See application file for complete search history.

(56) References Cited

FOREIGN PATENT DOCUMENTS

| CA | 1212257 | | 10/1986 |
|---|---|---|---|
| CN | 101973791 | * | 2/2011 |
| FR | 2519626 | | 7/1983 |
| JP | 01056388 | | 3/1989 |
| WO | WO 2006092720 A1 | * | 9/2006 |

OTHER PUBLICATIONS

Martins et al., Journal of Colloid and Interface Science, vol. 318, No. 2, pp. 210-216 (2008).*
European Search Report & Opinion for Application No. EP 11185875.9-2123, dated Feb. 16, 2012, 6 pages.

* cited by examiner

*Primary Examiner* — Porfirio Nazario Gonzalez
(74) *Attorney, Agent, or Firm* — International IP Group, LLC

(57) ABSTRACT

A method for producing chelate compounds is disclosed. A nitrogen source, an acidic source, and a first element source including sodium, chlorine, potassium, and/or lithium are received in a mixture. A second element source and water can also be received. The chelate compound can be optionally purified.

16 Claims, 3 Drawing Sheets

CHELATE COMPOUNDS

SPONSORSHIP STATEMENT

This application has been sponsored by the Iranian Nanotechnology Initiative Council, which does not have any rights in this application.

TECHNICAL FIELD

This application generally relates to chelate compounds, and more particularly relates to chelate nanocompounds and their production.

BACKGROUND

Chelate compounds, i.e., chelating agents, chelate complexes, chelants, chelators, and/or sequestering agents, have numerous commercial applications, such as, for example, plant nutrition as fertilizers, and animal nutrition and treatment as supplements and medicines, respectively. Known chelating agents include ethylenediaminetetraacetic acid (hereinafter "EDTA") and ethylenediamine-N,N'-bis(2-hydroxyphenylacetic acid) (hereinafter "EDDHA"), and known chelate complexes include iron-EDTA (hereinafter "Fe-EDTA") and iron-EDDHA (hereinafter "Fe-EDDHA").

Organic chelating agents and mineral-organic chelate complexes are generally known as collectors and transporters of metal ions, respectively. In alkaline, i.e., pH greater than or equal to 7, environments in plants and in both highly acidic, i.e., pH less than or equal to 4, environments and alkaline environments in animals, metal ions either have a very low absorbability or are non-absorbable due to the molecular structure of known chelate compounds. In particular, due to the type of bonds present in the known chelate compounds, the compounds lack the ability to capture or deliver the desired elements in alkaline environments and, as a consequence, they release the elements in the environment without having them affect the desired targets.

This low or non-absorbability of metal ions causes unwanted and irreversible side effects in plants and animals, such as, for example, the production of free radicals. As such, a need exists for novel chelate compounds that are capable of collecting and delivering various elements and/or metal ions to and from plants and animals in any environment.

SUMMARY

A method for producing chelate compounds is disclosed. Initially, a nitrogen source is received. Then, an acidic source and a first element source are received in a mixture. The first element source can be a compound that includes a sodium, chlorine, potassium, and/or lithium.

In some embodiments, a second element source can be received. The second element source can be a second metal element source, where the second metal source can include calcium, manganese, magnesium, iron, zinc, copper, molybdenum, silver, gold, lead, and/or cobalt. The second element source can be a second non-metal element source, where the second non-metal element source can include bromine, chlorine, arsenic, selenium, amino acids, carbohydrates, and/or fatty acids.

In some embodiments, the acidic source can be a weak acidic source, such as, for example, malic acid, formic acid, tartaric acid, stearic acid, acetic acid, citric acid, boric acid, oleic acid, oxalic acid, phenolic acid, phormic acid, and/or carboxylic acid.

In some embodiments, water can also be received. In some embodiments, the chelate compound can be purified. At least one dimension of the chelate compound can be less than or equal to 100 nanometers.

In some embodiments, the nitrogen source can be ammonium nitrate, the acidic source can be acetic acid, and the first element source and the second element source can be calcium chloride. In other embodiments, the nitrogen source can be urea, the acidic source can be oxalic acid, the first element source can be chlorine, and the second element source can be magnesium carbonate. In yet other embodiments, the nitrogen source can be ammonia, the acidic source can be stearic acid, and the first element source can be sodium citrate.

In some embodiments, the nitrogen source can be urea, the acidic source can be acetic acid, and the first element source can be potassium hydroxide. In other embodiments, the nitrogen source can be ammonium sulfate, the acidic source can be phenolic acid, the first element source can be lithium, and the second element source can be magnesium oxide. In yet other embodiments, the nitrogen source and the second element source can be calcium nitrate, the acidic source can be salicylic acid, and the first element source can be monopotassium phosphate.

A chelate nanocomplex can be synthesized by a process including receiving a nitrogen source, receiving an acidic source, receiving a first element source, where the first element source is a compound that includes sodium, chlorine, potassium, and/or lithium, receiving a second element source, and receiving water. At least one dimension of the chelate nanocomplex can be less than or equal to 100 nanometers.

Details of one or more embodiments and/or implementations of the chelate compounds are set forth in the accompanying drawings and the description below. Other aspects that can be implemented will be apparent from the description and drawings, and from the claims.

DESCRIPTION OF DRAWINGS

Like reference symbols indicate like elements throughout the specification and drawings.

DETAILED DESCRIPTION

The chelate compounds, such as, for example, chelate nanocompounds, disclosed in the present application improve the delivery and collection of various elements and/or metal ions in all pH environments, including highly acidic and alkaline environments. There are several reasons for the improved delivery and collection of various elements and/or metal ions. First, the small size, e.g., less than 100 nm in at least one dimension, of the chelate nanocompounds increases the likelihood of cell wall penetration.

Second, the unique arrangement of the atoms and molecules due to self-assembly of the chelate nanocompounds results in the formation of a structure exhibiting higher resistance against structural breakage and/or deformation in highly acidic or alkaline environments. Third, the high customizability of the chelate nanocompounds to deliver or collect different elements and/or metal ions enables the chelate nanocompounds to be optimized for various uses. The chelate nanocompounds can be used in various environments, such as, for example, farms, orchards, treatment facilities, factories, research centers, plants, animals, and/or humans.

Two or more types of chelate compounds are disclosed in the present application. The first type of chelate compound is chelate complexes, nanocomplexes, transporters, and/or nanotransporters that can deliver an element and/or metal ion to a target. For example, in some embodiments, iron chelate nanocomplexes can deliver iron to a target and calcium chelate nanocomplexes can deliver calcium to a target, such as, for example, cell walls. The second type of chelate compound is chelating agents, nanoagents, chelators, nanochelators, collectors, and/or nanocollectors that can collect an element and/or metal ion from a target. For example, in some embodiments, iron chelating nanoagents can collect iron from blood in thalassemia patients and calcium chelating nanoagents can collect calcium from blood in patients with heart disease.

Figure 1:
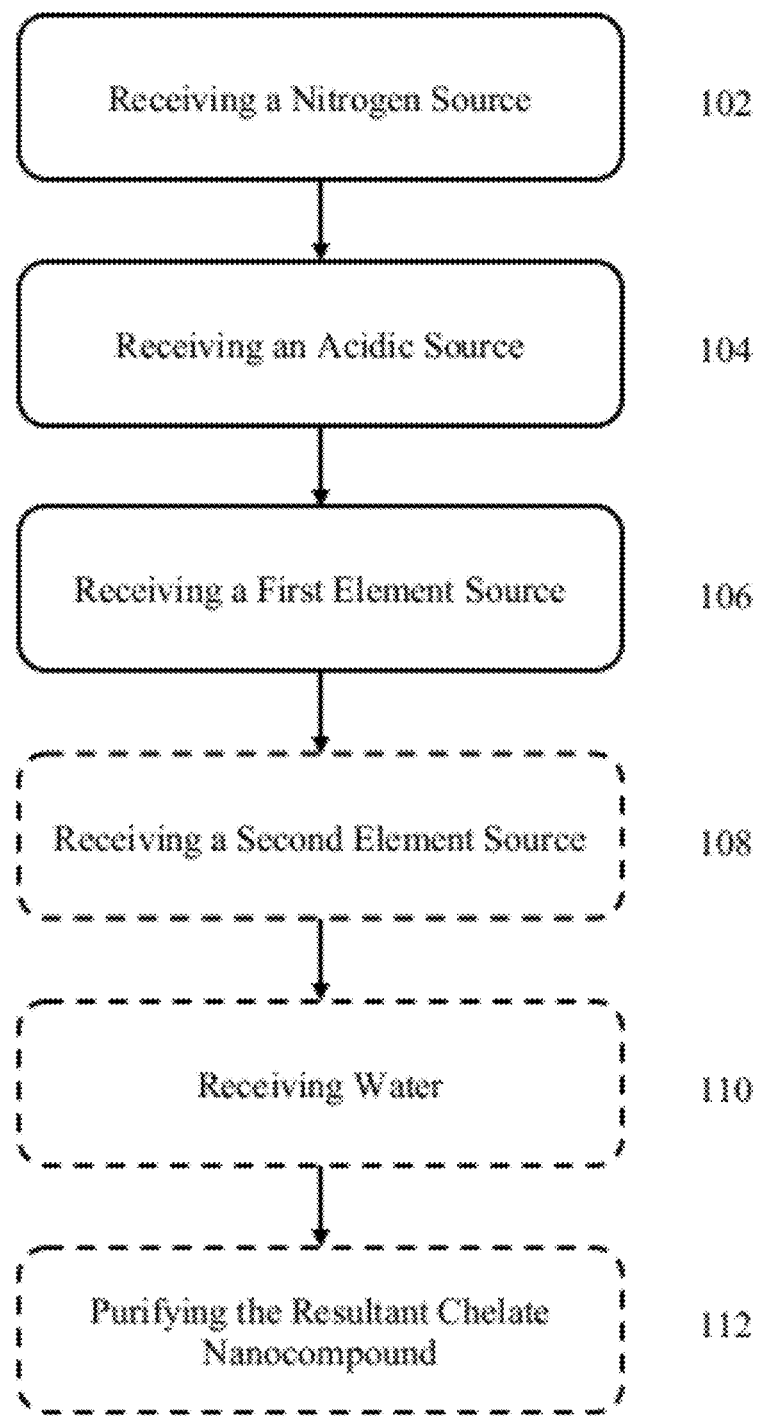
FIG. 1 is a flowchart of an example of a process for chelate compound production.

Referring to FIG. 1, a process 100 for chelate compound production is disclosed. Referring to step 102, initially, a nitrogen source is received in a mixture. The nitrogen source can be any compound including nitrogen, such as, for example, a compound containing one or more nitrates and/or a compound including one or more amine agents.

Referring to step 104, an acidic source is then received in the mixture. In some embodiments, the acidic source can be a weak acidic source, i.e., an acid that dissociates incompletely in water and has a relatively high pH. The acidic source can be, for example, malic acid, formic acid, tartaric acid, stearic acid, acetic acid, citric acid, boric acid, oleic acid, oxalic acid, phenolic acid, phormic acid, carboxylic acid, and/or any combination thereof.

Referring to step 106, a first element source is then received in the mixture. In some embodiments, the first element source can be any compound including a source of sodium (Na), chlorine (Cl), potassium (K), and/or lithium (Li), such as, for example, chlorides, sodium salts, potassium salts, and/or lithium salts.

Nest, referring to step 108, a second element source can be optionally received in the mixture. In some embodiments, the second element source can be a metal source or non-metal source. For example, the second metal element source can be any compound including a metal element, such as, for example, calcium (Ca), manganese (Mn), magnesium (Mg), iron (Fe), zinc (Zn), copper (Cu), molybdenum (Mo), silver (Ag), gold (Au), lead (Pb), and/or cobalt (Co). The second non-metal element source can be any compound including a non-metal element, such as, for example, bromine (Br), chlorine (Cl), arsenic (As), selenium (Se), amino acids, carbohydrates, and/or fatty acids.

The determination of whether to include step 108 in the process 100 for production of the chelate compounds, and the determination of the amount of the second element source to include in step 108 can depend on, for example, whether a chelate nanocomplex or a chelating nanoagent is being produced. In some embodiments, if a chelate nanocomplex for delivering an element and/or metal ion is being produced, step 108 for including a second element source of that element can be included in the process 100. In other embodiments, if a chelating nanoagent is being produced for collecting an element and/or metal ion, step 108 can be excluded from the process 100.

Referring to step 110, water can be optionally received in the mixture. In some embodiments, water can be received for use as a catalyst and/or facilitator of a chemical reaction. The determination of whether to include step 110 in the process 100 depends on the particular chelate compound being produced and whether the sources combined to produced the particular chelate compound require hydration to trigger the chemical self-assembly reaction.

Referring to step 112, the chelate compound that is produced as a result of steps 102-110 can optionally be purified. The chelate compound can be purified by, for example, chromatography, filtration, centrifugation, evaporation, extraction, crystallization, and/or adsorption.

Although FIG. 1 illustrates that the nitrogen source is initially received in the mixture in step 102, followed by reception of the acidic source in step 104, the first element source in step 106, the second element source in step 108, and water in step 110, it is to be understood that many possible orderings of the steps can be used in the process 100, depending on the particular chelate compound to be produced and/or user preference. Therefore, any order of steps 102-110 are within the scope of the present application.

Process 100 for the production of chelate compounds can be exothermic, i.e., a process that releases energy in the form of heat. Therefore, depending on the particular chelate compound being produced and amount of heat released during process 100, external heat may or may not be added to the process 100. In some embodiments, the temperature at which the process 100 is performed can range from, for example, 40 to 140° C. In addition, the production of chelate compounds can be optimized at various pressures that can range from, for example, zero to 2 bars, depending on the particular chelate compound being produced.

During the process 100, self-assembly, i.e., the spontaneous and reversible organization of molecular units into ordered structures by non-covalent interactions occurs and the chelate compounds are formed. In other words, the chelate compounds build themselves due to at least three factors. First, the self-assembled chelate compounds must have a higher order than their isolated components. Second, the role of weak interactions, such as, for example, Van der Waals forces, is important in the formation of the self-assembled chelate compounds. Third, the building blocks of the self-assembled chelate compounds include not only atoms and molecules, but can also include a wide range of nano- and mesoscopic structures, with different chemical compositions, shapes and functionalities.

Several examples of production of chelate compounds are provided. In a first example, a calcium chelate complex, such as a calcium chelate nanocomplex, can be produced according to the process 100. Initially, 10 grams of ammonium nitrate (step 102) can be mixed with 40 grams of acetic acid (step 104) and 10 cubic centiliters of water (step 110). The mixture can be stirred until the solution is uniform. Next, 100 grams of calcium chloride (step 106 and step 108) is gradually added and the mixture is stirred for 15 minutes at a pressure of 0.1 bars without the addition of external heat. Calcium chloride acts as both the first element source and the second element source. After the calcium chelate complex has been produced, it is purified (step 112) by ultrasonic centrifugation for 30 minutes. The resulting liquid from the upper phase is then collected and dried in an oven at 110° C. The result is a calcium chelate complex that can deliver calcium to a desired target.

In a second example, a magnesium chelate complex, such as a magnesium chelate nanocomplex, can be produced according to the process 100. Initially, 10 grams of urea (($NH_2$)$_2$CO), having two amine groups joined by a carbonyl functional group (step 102), 55 grams of oxalic acid (step 104), and 105 grams of magnesium carbonate ($MgCO_3$) (step 108) are dissolved in water (step 110) and stirred until the mixture is uniform. The amount of water in milliliters can be equal to 10-30% of the total weight of the mixture in grams.

For example, if the mixture weighs 170 grams total, 17 to 51 milliliters of water can be used to dissolve the mixture. Next, 50 grams of chlorine (step 106) is added to the uniform mixture and external heat is added until the temperature reaches 100° C. The boiling mixture is stirred for 20 minutes and then allowed to cool to 60° C. The resultant homogenous solution is filtrated and/or chromatographed (step 112) to obtain a 99% pure magnesium chelate complex that can deliver magnesium to a desired target.

In a third example, a calcium chelator agent, such as a calcium chelator nanoagent, can be produced according to process 100. Initially, 10 grams of 65% ammonia ($NH_3$) (step 102), 70 grams of stearic acid (step 104), and 10 cubic centiliters of water (step 110) are mixed and stirred until the mixture is uniform. Next, 50 grams of sodium citrate (step 106) is added to the mixture. The mixture is continuously stirred in the presence of external heat at a temperature of 70° C. and at a pressure of 0.5 bars for 30 minutes. The resulting solution is then consecutively dried in an oven at 120° C. for 10 minutes, at 100° C. for 7 minutes, and 80° C. for 5 minutes to obtain a calcium chelator agent that can collect calcium from a target.

In a fourth example, a potassium chelator agent, such as a potassium chelator nanoagent, can be produced according to the process 100. Initially, approximately 10 grams of acetic acid (step 104) can be mixed with approximately 0.5 grams of urea (step 102) and about 2 cubic centiliters of water (step 110) for about 10 minutes and stirred until the mixture is uniform. Next, over a time period of about 5 minutes, approximately 3 grams of potassium hydroxide (step 106) is gradually added to the mixture and the mixture is then stirred for about 5 minutes without the addition of external heat. Then, the mixture is allowed to cool to about 37° C., at which temperature the mixture is maintained for about 1 hour. The resultant homogenous solution is filtrated and/or chromatographed (step 112) and is then consecutively dried for 30 minutes to obtain a potassium chelator agent that can collect potassium from a target.

In a fifth example, a magnesium chelate complex, such as a magnesium chelate nanocomplex, can be produced according to process 100. Initially, 100 grams of magnesium oxide (MgO) (step 108), 4 grams of ammonium sulfate (($NH_4)_2SO_4$) (step 102), and 45 grams of phenolic acid (step 104) are mixed and stirred until the mixture is uniform. Next, 35 grams of lithium (step 106) is gradually added to the mixture over a time period of 10 minutes and then mixed without the addition of external heat for about 10 minutes. The resultant homogenous solution is filtrated and/or chromatographed (step 112) and may be dried to obtain magnesium chelate complex that can deliver magnesium to a desired target.

In a sixth example, a calcium chelate complex, such as a calcium chelate nanocomplex, can be produced according to process 100. Initially, 50 grams of calcium nitrate ($Ca(NO_3)_2$) (step 102 and step 108) and 15 cubic centiliters of water (step 110) are mixed and stirred until the mixture is uniform. Next, about 25 grams of salicylic acid (step 104) and 19 grams of monopotassium phosphate (step 106) are added to the mixture and stirred until the mixture is uniform. The resulting solution is then consecutively dried in an oven at 92° C. for 5 minutes. The temperature of the oven is gradually allowed to drop to 25° C. over a period of 15 minutes. The resultant homogenous solution is filtrated and/or chromatographed (step 112) to obtain a calcium chelate complex that can deliver calcium to a desired target When used as a fertilizer and/or with another fertilizer, for example, the chelate compounds increase the amount of crop produced, enrich the crop with greater nutrients, improve the shelf life of the crop, increase the resistance of the crop against pests and, thereby, reduce the amount of pesticide necessary, and increase the resistance of crops against frostbite and other environmental effects. In addition, the chelate compounds can reduce spoiled crop, improve soil texture, reduce underground water pollution, and increase the metabolism in plants resulting in more efficient absorption of elements in the soil and other fertilizers.

Saffron Yield Example

Figure 2:
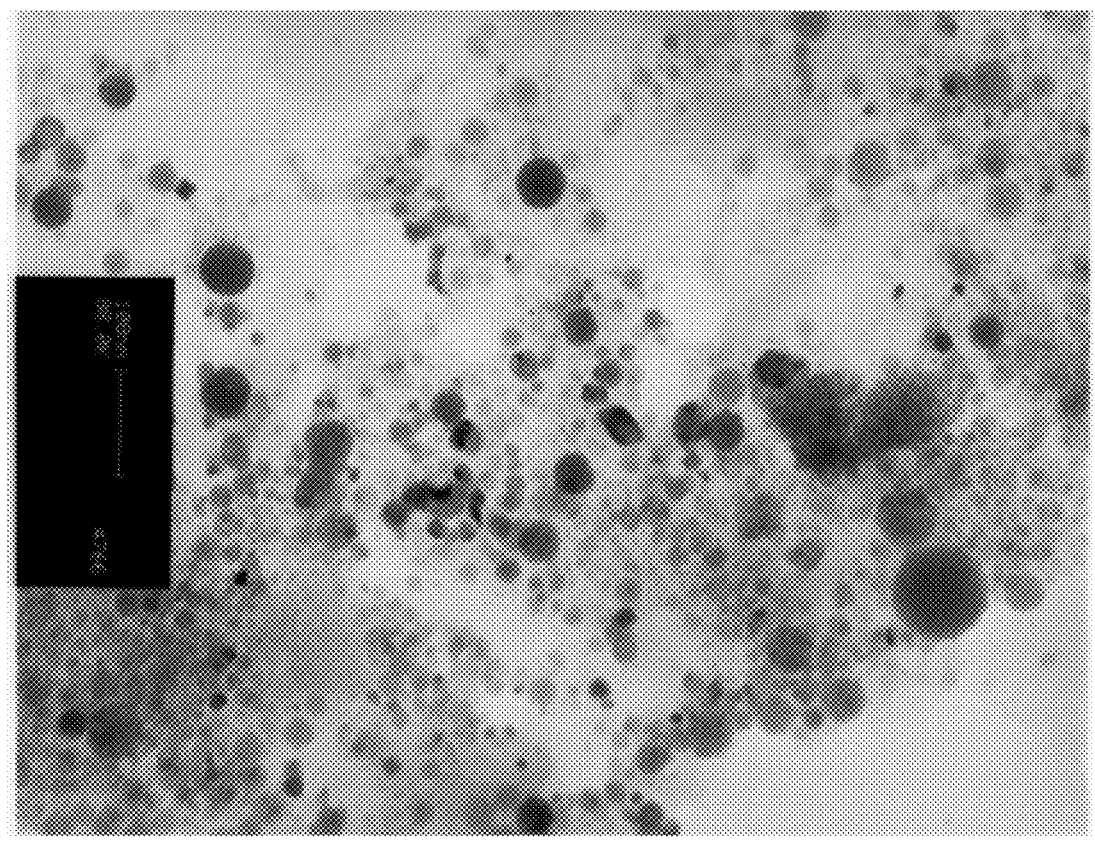
FIG. 2 is a transmission electron microscopy image of an example iron chelate nanocomplex.

An iron chelate nanocomplex, such as the iron chelate nanocomplex illustrated in the transmission electron microscopy image in FIG. 2, was used as part of a fertilizer applied to randomly selected saffron fields measuring 1.54 hectares in the Lorestan Province of Iran. The saffron bulbs were approximately one year-old. As illustrated in Table 1 below, two experimental groups and one control group were tested. In the first experimental group, a fertilizer application rate of 10 kilograms per hectare was used, in the second experimental group, a fertilizer application rate of 5 kilograms per hectare was used, and in the control group, no fertilizer was applied. The fertilizer was evenly applied during the first irrigation and the dry weight of saffron was measured at the time of harvest.

TABLE 1

| Fertilizer Amount (g) | Fertilizer Application Rate (kg/hectare) | Dry Saffron Production Weight (g) | Dry Saffron Production Rate (g/hectare) |
|---|---|---|---|
| 462 | 10 | 97.0 | 62.98 |
| 231 | 5 | 76.0 | 49.25 |
| 0 | 0 | 52.0 | 33.76 |

Applying the fertilizer including the iron chelate nanocomplex at the rate of 5 and 10 kilograms per hectare resulted in a significant increase in the production weight and production rate of saffron relative to the control group. In particular, applying the fertilizer at the rate of 5 kilograms per hectare increased the production weight and production rate of saffron by over 1.4 times relative to the control group. Applying the fertilizer at the rate of 10 kilograms per hectare increased the production weight and production rate of saffron by over 1.8 times relative to the control group and by over 1.2 times relative to the other experimental group.

Tomato Yield Example

An iron chelate nanocomplex was used as part of a fertilizer applied to randomly selected tomato fields in the city of Shahriar, Iran. Two experimental groups and one control group were tested. In the first experimental group, a fertilizer application rate of 10 kilograms per hectare was used, in the second experimental group, a fertilizer application rate of 5 kilograms per hectare was used, and in the control group, no fertilizer was applied. The fertilizer was added to water used to irrigate the soil during the early period of flowering and the tomatoes were weighed and their calcium, potassium, zinc, and iron content were tested at the time of harvesting.

The fertilizer application rate of 5 kilograms per hectare resulted in the best performance of tomato production. Each tomato produced by applying the fertilizer at the rate of 5 kilograms per hectare weighed, on average, 35 grams more than an average tomato produced in the control group. In addition, the tomatoes produced by applying the fertilizer at the rate of 5 kilograms per hectare had over 20% more calcium, approximately two and a half times more iron content, and over 10% more potassium relative to the tomatoes produced in the control group.

The tomatoes produced by applying the fertilizer at the rate of 10 kilograms per hectare only had a higher percentage of potassium content relative to the tomatoes produced in the other experimental group.

Mice Tumor Example

An iron chelate nanoagent was used to target excessive cations in mouse tumors. A dose of 0.01 mg of the iron chelate nanoagent for every gram of the weight of the mouse was injected into the mouse once at the start of a five day monitoring period. Once the iron chelate nanoagent entered the body of the mice, it collected the target element, e.g., iron. Next, a conjugate of the iron chelate nanoagent and iron passes through the liver to be metabolized and exits the body. The sizes of the tumors in the mice were measured by a caliper and the iron content in the urine samples of the mice was measured by atomic absorption.

Figure 3:
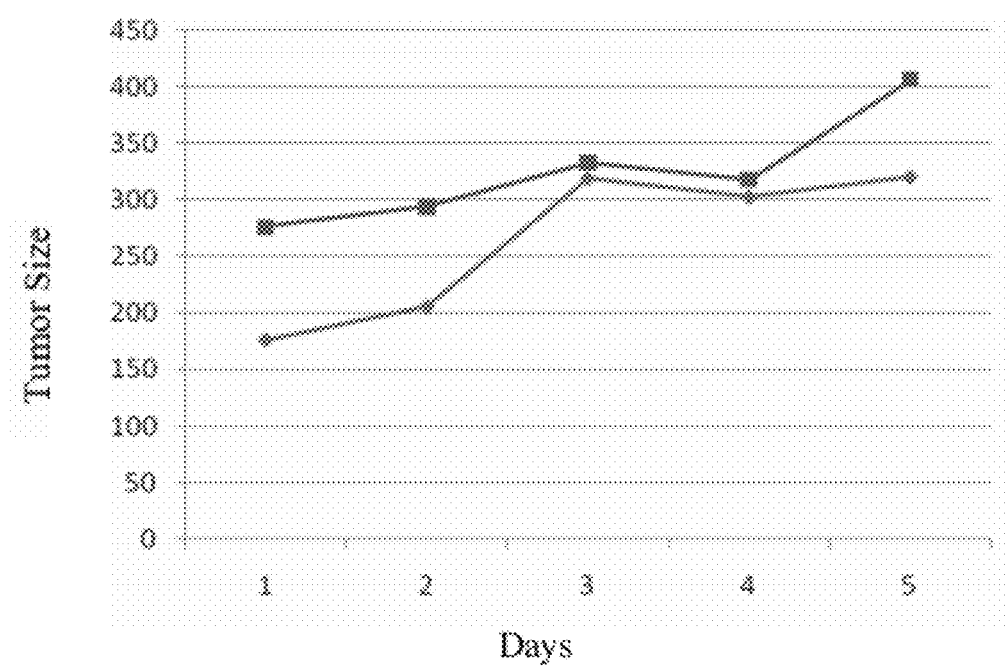
FIG. 3 is a chart showing tumor growth in mice over a five day period.

A chart showing the tumor growth in a mouse that was not been treated with an iron chelate nanoagent, the control mouse (squares), and the tumor growth in a mouse that was treated with an iron chelate nanoagent (diamonds) is illustrated in FIG. 3. The x-axis represents the day and the y-axis represents the tumor size in micrometers. As FIG. 3 shows, the mouse that was treated with the iron chelate nanoagent exhibited a lower rate of tumor growth relative to the control mouse. This shows that tumor growth, such as, for example, breast cancer tumor growth, can be controlled in mouse using an iron chelate nanoagent.

It is to be understood the implementations are not limited to the particular devices or apparatus described which may, of course, vary. For example, the chelate compounds can include a coloring agent, such as, for example, an iron(III) salt. The chelate compounds can be included in a composition that is in a solid form, such as, for example, in the form of a powder, granules, pellets, and tablets, or in a liquid form. The chelate nanocompounds can be included in a fertilizer that is applied to a crop. The crop can be any crop, edible or non-edible. For example, the crop can be a fruit, a vegetable, a grain, a nut, and/or a flower. The process 100 can be performed at, for example, a batch plant.

It is also to be understood that the terminology used herein is for the purpose of describing particular implementations only, and is not intended to be limiting. As used in this specification, the singular forms "a", "an" and "the" include plural referents unless the content clearly indicates otherwise.

Accordingly, other implementations are within the scope of this application.

What is claimed is:

1. A method for producing a self-assembled chelate compound, the method comprising:
    mixing a nitrogen source and a weak acid to form a first mixture;
    adding a first element source to the first mixture to produce the self-assembled chelate compound; and
    purifying the self-assembled chelate compound, wherein
        the weak acid is an acid selected from the group consisting of malic acid, formic acid, tartaric acid, stearic acid, acetic acid, citric acid, boric acid, oleic acid, oxalic acid, phenolic acid, phormic acid, salicylic acid, and carboxylic acid,
        the first element source is a compound that includes a first element selected from the group consisting of sodium, chlorine, potassium, and lithium, and
        addition of the first element source to the first mixture results in an exothermic reaction that is controlled at a predetermined temperature and a predetermined pressure.

2. The method of claim 1, further comprising adding a second element source including a second element to the first mixture, wherein the self-assembled chelate compound is a self-assembled chelate complex that is capable of delivering the second element to a target.

3. The method of claim 2, wherein adding the second element source including the second element to the first mixture comprises adding a second metal element source including a metal element to the first mixture.

4. The method of claim 3, wherein adding the second metal element source including the second metal element to the first mixture comprises adding a compound including a metal selected from the group consisting of calcium, manganese, magnesium, iron, zinc, copper, molybdenum, silver, gold, lead, and cobalt to the first mixture.

5. The method of claim 2, wherein adding the second element source including the second element to the first mixture comprises adding a second non-metal element source including a non-metal second element to the first mixture.

6. The method of claim 5, wherein adding the second non-metal element source including the non-metal second element to the first mixture comprises adding a compound including a non-metal selected from the group consisting of bromine, chlorine, arsenic, selenium, amino acids, carbohydrates, and fatty acids to the first mixture.

7. The method of claim 1, further comprising adding water to the first mixture.

8. The method of claim 1, wherein the average size of the self-assembled chelate compound is less than or equal to 100 nanometers.

9. The method of claim 2, wherein:
    the nitrogen source is ammonium nitrate;
    the weak acid is acetic acid; and
    the first element source and the second element source are calcium chloride.

10. The method of claim 2, wherein:
    the nitrogen source is urea;
    the weak acid is oxalic acid;
    the first element source is chlorine; and
    the second element source is magnesium carbonate.

11. The method of claim 1, wherein:
    the nitrogen source is ammonia;
    the weak acid is stearic acid; and
    the first element source is sodium citrate.

12. The method of claim 1, wherein:
    the nitrogen source is urea;
    the weak acid is acetic acid; and
    the first element source is potassium hydroxide.

13. The method of claim 2, wherein:
    the nitrogen source is ammonium sulfate;
    the weak acid is phenolic acid;
    the first element source is lithium; and
    the second element source is magnesium oxide.

14. The method of claim 2, wherein:
    the nitrogen source and the second element source are calcium nitrate;
    the weak acid is salicylic acid; and
    the first element source is monopotassium phosphate.

15. The method of claim 1, wherein the self-assembled chelate compound is a self-assembled chelate agent that is capable of collecting an element and/or metal ion from a target.

16. The method of claim 2, wherein the first element source is different from the second element source.

* * * * *